Patented Aug. 14, 1951

2,563,870

UNITED STATES PATENT OFFICE 2,563,870

UNSATURATED MONOHYDRIC PHENOLIC ETHER-MODIFIED DRYING OILS AND PROCESS OF MAKING SAME

John B. Rust, East Hanover, and William B. Canfield, Montclair, N. J., assignors, by direct and mesne assignments, of one-half to Montclair Research Corporation, a corporation of New Jersey, and one-half to Ellis-Foster Company, a corporation of New Jersey No Drawing. Application November 12, 1947, Serial No. 785,542

23 Claims. (Cl. 260—407)

The present invention relates to new modified drying oil products and to a process for the preparation of the same. More particularly, it relates to the reaction products of drying oils or drying oil products such as drying oil acids or drying oil-containing alkyd resins, and unsaturated polymerizable monohydric phenolic compounds containing from 2 to 4 beta-unsaturated aliphatic groups having from 3 to 4 carbon atoms. Such unsaturated, polymerizable phenolic compounds are exemplified by allyl allylphenyl ethers and allyl allylphenoxy esters and may be represented by the general formula:

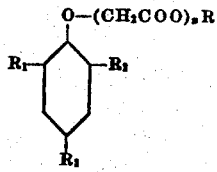

Where R and $R_1$ are beta-unsaturated aliphatic hydrocarbon radicals having from 3 to 4 carbon atoms, $R_2$ and $R_3$ are hydrogen, lower alkyl or beta-unsaturated radicals of the type R and $R_1$, and $x$ is a number equal to 0 or to 1.

These unsaturated phenolic ethers and esters may be obtained as high-boiling liquids in a substantially pure state, as they are capable of being distilled under reduced pressure without undue polymerization. They appear to be slow to polymerize in the presence of peroxides or metallic driers. However, high temperatures particularly in the presence of minute quantities of mineral acids such as hydrogen chloride, sulphuric acid, phosphoric acid, paratoluenesulphonic acid and the like, or such anhydrous salts as stannic chloride, aluminum chloride, boron trifluoride and the like, readily convert them into infusible, insoluble masses which are highly resistant to the action of aqueous alkalies. When these unsaturated phenolic compounds are polymerized in the presence of the above mentioned catalysts, characteristic red to dark-brown color-bodies are formed which give rise to the production of characteristically dark products. On the other hand, when they are combined with drying oil material such as drying oils or drying oil-containing alkyd resins, reaction is fairly rapid and unexpectedly light-colored, highly viscous, color-stable products are obtained which when saponified are completely soluble in water. When the latter aqueous solution is acidified and the hydrolytic product washed and dried, the acids from these modified oils or oil acid-containing products show acid numbers of 100 to 160 depending upon the amount of unsaturated phenolic compound employed.

These modified oils or oil-containing products may be converted by metallic driers, or a combination of metallic driers and heat, to insoluble infusible masses which posses surprisingly good resistance to the action of aqueous alkalies.

Thus, the following objects of the present invention are apparent:

(1) To provide a modified drying oil composition of light color and low acid number which may be converted by metallic driers into hard, fast drying, infusible masses which are substantially resistant to the action of aqueous alkali solutions.

(2) To provide a modified drying oil or drying oil-containing alkyd resin of light color and low acid number which may be converted by metallic driers and heat into hard, non-yellowing insoluble films which have high resistance to the action of aqueous alkali solutions.

(3) To provide a modified drying oil which is fast bodying.

(4) To provide a modified drying oil which may be heated with rosin esters, phenolic resins, alkyd resins, natural resins, and the like to give rapid-drying coating compositions.

Other objects of the present invention will become apparent from the more detailed description set forth below.

These objects are attained by heating the unsaturated phenolic compound with unsaturated fatty acid radical-containing material, the latter being:

1. A drying oil (raw or bodied) or a polyhydric alcohol ester of drying oil acids other than the glycerol ester, 2. Drying oil acids, which may be individual unsaturated acids or the mixed acids resulting from saponifying a drying oil, 3. A drying oil-modified alkyd resin, 4. A stoichiometrical mixture of drying oil acids and polyhydric alcohol (e. g., glycerol, pentaerythritol, etc.) to form an ester during the heating process, or 5. A stoichiometrical mixture of drying oil acids, polyhydric alcohol and polycarboxylic acid (e. g., phthalic, succinic, adipic, sebacic, etc.) to form an alkyd resin during the heating process.

The drying oil material and the unsaturated phenolic compound are heated together in a suitable reactor at a temperature of 200° C.-300° C. until the reaction is substantially complete as shown by no more refluxing of the unsaturated phenolic compound. Heating is then continued until the reaction mixture reaches the desired viscosity. In general, a temperature of 260° C.- 280° C. for 3 to 6 hours is sufficient to complete the reaction. In practice, an inert atmosphere of carbon dioxide or nitrogen may be employed to prevent any oxidation of the oil product, although its use is not essential. Neither is it necessary to employ the catalysts previously mentioned in the reaction, since combination takes place in the presence of heat as already described. Except where drying oil acids alone are reacted with the phenolic compound, the resulting reaction products are clear and light-colored and have a very low acid number. The reaction products from drying oil acids and the phenolic compounds are acids which may be esterified or converted into salts, e. g., soaps, metallic driers, etc.

The products of this invention range from oils having a Gardner viscosity of C or D to hard, tough, resinous masses depending upon the formulation and the heat treatment of the product. They may be blended with cellulose esters such as nitrocellulose to give hard, tough, flexible air-drying coatings. They may also be used to modify rosin esters, phenolic resins, urea-formaldehyde resins, melamine-formaldehyde resins, and the like. They may also be combined with styrene, acrylic acid esters, methacrylic acid esters, acrylonitrile, and the like to obtain products useful to those skilled in the art. Such a combination with styrene, acrylic acid esters, methacrylic acid esters and the like may be secured in the following ways:

(a) Reaction between the modified oil and the vinyl type compound, followed by polymerization, and (b) Reaction between the unsaturated phenolic compound and vinyl type compound followed by reaction with the drying oil material.

In practicing the process of the present invention it is possible to employ as little as 1% or as much as 50% of the unsaturated phenolic product (based on the drying oil material); however, proportions of 5% to 30% are to be preferred, since this range of unsaturated phenolic compound imparts the desired degree of modification to the drying oil material.

We do not wish to limit ourselves to any theoretical explanation of the reaction although it is probable that the reaction involved is one of addition. It is presumably an addition of the allyl groups (or other unsaturated hydro-carbon radicals) of the phenolic ether to the unsaturated fatty acid radicals, since drying properties and alkali resistance, as shown in the accompanying examples, appear to be superior where proportions of about one fatty acid radical to one beta-unsaturated alkyl group are employed.

As noted above it is possible to employ drying oil-modified alkyd resins in place of drying oils, or to employ a mixture of drying oil fatty acids, polyhydric alcohol, polycarboxylic acid and unsaturated phenolic ether (e. g., a mixture of linseed oil acids, pentaerythritol, phthalic anhydride and the methallyl ether of triallylphenol) the object, thereby, being to provide modified drying oil products having superior drying qualities and superior resistance to alkalies. Also, as noted above it is within the scope of the present invention to provide modified oil products wherein drying oil fatty acids, polyhydric alcohol, and unsaturated phenolic ether are reacted together simultaneously to provide an oil product having the properties heretofore disclosed.

There are, of course, numerous unsaturated phenolic compounds of the type employed in the practice of the present invention. For the purpose of exemplification, these include unsaturated ethers of all monohydric phenols of the type:

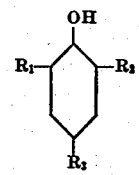

wherein $R_1$ is a beta-unsaturated aliphatic radical such as allyl, methallyl, crotyl or butenyl, and $R_2$ and $R_3$ are hydrogen, lower alkyl groups such as methyl, or radicals of the type $R_1$. The meta-positions of the phenol may be substituted by alkyl groups such as methyl if such groups are present in the phenolic compound used as raw material for making the unsaturated phenol. The ethers are prepared in known manner by treating the phenols with the appropriate unsaturated alkyl halide such as allyl chloride, methallyl choride, 3-chorobutene-1, or crotyl bromide or, in the case of the unsaturated alkyl phenoxy acetates, by treating the phenol with chloroacetic acid and then esterifying the unsaturated phenoxyacetic acid with an unsaturated monohydric alcohol having from 3 to 4 carbon atoms (e. g., allyl, methallyl or crotyl). The preparation of allyl diallylphenoxy-acetate is illustrative:

One hundred parts (0.575 mole) of diallyl phenol are dissolved in a solution of 23 parts of sodium hydroxide in 200 parts of water to form a clear solution of diallyl sodium phenate. A solution of 54.4 parts of chloroacetic acid dissolved in 125 parts of water is mixed with a solution of 30.5 parts of sodium carbonate in 125 parts of water to form sodium chloroacetate. The aqueous solution of sodium chloroacetate and the aqueous solution of sodium diallylphenate are refluxed together at 90°-100° C. for 3 hours. The resulting aqueous solution is neutralized by bubbling carbon dioxide into the reaction product and then acidified with 10% aqueous hydrochloric acid. The resulting white powder is filtered, washed free of mineral acid and dried. A yield of 92.6 parts of diallyl phenoxyacetic acid is obtained. A mixture of 85 parts of diallyl phenoxyacetic acid, 100 parts of allyl alcohol, 200 parts of benzene, 1.8 parts of powdered copper, and 1.8 parts of paratoluenesulphonic acid is refluxed together while azeotropically removing the water of esterification. The resulting ester is washed, first with saturated sodium carbonate and then with water, and finally dried over anhydrous calcium chloride. The benzene solvent is removed under vacuum at 90°-100° C.

Another type of reaction product can be obtained by heating a drying oil with a phenol having more than one beta-unsaturated aliphatic group (e. g., diallyl phenol or triallylphenol). For fast drying coating compositions such products are less satisfactory on account of the presence of a free phenolic group.

While most of the examples herein teach the use of linseed oil, other drying oils and drying oil acids such as China-wood oil, oiticica oil, soya bean oil, cottonseed oil, perilla oil, corn oil, sunflower seed oil and the like may be employed and are to be considered within the scope of the present invention. Also, although the examples illustrate only allyl compounds, it is to be understood that methallyl and crotyl derivatives are suitable as well as compounds having mixed unsaturated aliphatic radicals.

The following examples are given by way of illustration only and should not be considered as limiting. All proportions are in parts by weight.

EXAMPLE 1

150 parts of raw linseed oil and 45 parts of the allyl ether of allyl phenol are heated together in a one liter, 3-neck flask equipped with a water-cooled condenser, stirrer, and thermometer carefully to 240° C. The resulting clear reaction mixture is heated finally at 240° C.–250° C. for 6 hours. A light-colored, clear oil is secured which possesses a Gardner viscosity of F and an acid number of 3.

A film of the oil containing 0.6% lead and 0.06% cobalt as naphthenates air dries to a hard, non-tacky film in 24 hours.

EXAMPLE 2

150 parts of raw linseed oil and 30 parts of the allyl ether of diallyl phenol are heated together in a one liter, 3-neck flask equipped with a water-cooled condenser, stirrer, and thermometer carefully to 250° C. The resulting clear reaction mixture is heated finally at 240° C.–260° C. for 5 hours. A light-colored, clear oil is secured which possesses a Gardner viscosity of E–F and an acid number of 4. A film of the oil containing 0.6% lead and 0.06% cobalt as naphthenates air dries to a hard, non-tacky film in 24 hours.

50 parts of ester gum and 80 parts of the oil of Example 2 are heated together to 290° C. in ½ hour and held at 280° C.–290° C. for 70 minutes. The resulting varnish base could be drawn into a string 24 inches in length. The varnish base is light colored. It is thinned with V. M. and P. naphtha to 50% solids. The varnish possesses a Gardner viscosity of E.

To 50 parts of the above varnish is added 0.015% cobalt as cobalt naphthenate based upon the oil content of the varnish. A film of the varnish is baked for 1 hour at 120° C. The baked film is non-yellowing. It possesses a Sward Rocker hardness of 41, and turns white in 1% aqueous alkali solution after 25 minutes immersion.

To 50 parts of the above varnish is added 0.6% lead and 0.06% cobalt as naphthenates based upon the oil content of the varnish. The varnish air dries to a tack-free film in 4¼ hours. The dried film possesses a Sward hardness of 33 after 24 hours and 47 after 96 hours.

EXAMPLE 3

150 parts of raw linseed oil and 22½ parts of the allyl ether of triallyl phenol are heated together in a one liter, 3-neck flask equipped with a water-cooled condenser, stirrer, and thermometer carefully to 250° C. The resulting clear reaction mixture is heated finally at 240°–250° C. for 3 hours. A light-colored, clear oil is secured which possesses a Gardner viscosity of G and an acid number of 5. A film of the oil containing 0.6% lead and 0.06% cobalt as naphthenates air dries to a hard, non-tacky film in 24 hours.

50 parts of ester gum and 80 parts of the oil of Example 3 are heated together to 290° C. in ½ hour and at 280° C.–290° C. for 60 minutes. The resulting varnish base could be drawn into a string 24 inches in length. The light-colored varnish base is thinned to 50% solids with V. M. and P. naphtha. The varnish possesses a Gardner viscosity of F.

To 50 parts of the above varnish is added 0.015% cobalt as cobalt naphthenate based upon the oil content of the varnish. A film of the varnish is baked for one hour at 120° C., and is non-yellowing. It possesses a Sward Rocker hardness of 39 and turns white in 1% aqueous alkali after 35 minutes of immersion.

To 50 parts of the above varnish is added 0.6% lead and 0.06% cobalt as naphthenate based upon the oil content of the varnish. The varnish air dries to a tack-free film in 5 hours. The dried film possesses a Sward hardness of 29 after 24 hours and 44 after 96 hours.

EXAMPLE 4

100 parts of raw soya bean oil and 20 parts of the allyl ether of triallyl phenol are heated together in a one liter, 3-neck flask equipped with a water-cooled condenser, stirrer, and thermometer carefully to 250° C. The resulting clear reaction mixture is heated finally at 260° C.–280° C. for 4½ hours. A light-colored clear oil is secured which possesses a Gardner viscosity of E and an acid number of 3. A film of the oil containing 0.6% lead and 0.06% cobalt as naphthenates air dries to a hard, non-tacky film in 24 hours.

EXAMPLE 5

150 parts of raw linseed oil and 15 parts of the allyl ester of allylphenoxyacetic acid are heated together in a one-liter, 3-neck flask equipped with a stirrer, thermometer, and water-cooled condenser to 250° C. The resulting clear reaction mixture is heated finally at 260° C.–270° C. for 6 hours. A light-colored clear oil is secured which possesses a Gardner viscosity of E and an acid number of 9. A film of the oil containing 0.015% cobalt as cobalt naphthenate is baked for ½ hour at 160° C. The baked film is hard, somewhat wrinkled and non-yellowing.

EXAMPLE 6

150 parts of raw linseed oil and 60 parts of the allyl ester of allylphenoxyacetic acid are heated together in a one liter, 3-neck flask equipped with a stirrer, thermometer, and water-cooled condenser to 250° C. The resulting clear reaction mixture is heated finally at 260°–270° C. for 4¼ hours. A light-colored, clear oil is obtained which has a Gardner viscosity of H.

50 parts of ester gum and 80 parts of the oil of Example 8 are heated together to 280° C. in ½ hour. Heating is thereafter continued at 280° C.–290° C. for 70 minutes. The resulting varnish base could be drawn into a string 24 inches in length. The light-colored varnish base is thinned with V. M. and P. naphtha to 50% solids. The Gardner viscosity is F.

To 50 parts of the above varnish is added 0.015% cobalt as cobalt naphthenate based upon the oil content of the varnish. A film of the varnish (baked for 1 hour at 120° C.) is non-yellowing. It possesses a Sward Rocker hardness of 55 and turns white in 1% aqueous alkali after 45 minutes immersion.

To 50 parts of the above varnish is added 0.6% lead and 0.06% cobalt as naphthenates based upon the oil content of the varnish. The varnish air dries to a tack-free film in 4 hours. The dried film possesses a Sward hardness of 57 after 24 hours and 57 after 96 hours.

EXAMPLE 7

150 parts of raw soya bean oil and 45 parts of the allyl ester of diallylphenoxyacetic acid are heated together in a one liter, 3-neck flask equipped with a water-cooled condenser, stirrer, and thermometer to 250° C. for 5 hours. A light-colored clear oil is obtained, having a Gardner viscosity of F and an acid number of 10.2. A film of the oil containing 0.015% cobalt as cobalt naphthenate is baked for 1 hour at 120° C. The resulting film is non-yellowing, and possesses a Sward Rocker hardness of 41. The baked film clouds somewhat after immersion in 1% aqueous alkali for 1 hour.

The ester gum varnishes from the oil examples were carefully compared with a like varnish from ester gum and bodied linseed oil "Alinco Z-2." 50 parts of ester gum and 80 parts of bodied linseed oil are heated together to 280° C. in ½ hour The resulting varnish base is then heated further at 280°-290° C. for 110 minutes. The resulting varnish base could be drawn into a string 24 inches in length. The varnish base when thinned to 50% solids with V. M. and P. naphtha has a Gardner viscosity of D. To 50 parts of the above varnish is added 0.015% cobalt as cobalt naphthenate based upon the oil content of the varnish. A film of the varnish is baked for one hour at 120° C. and darkened decidedly. It possesses a Sward Rocker hardness of 24 and turns white in 1% aqueous alkali after 15 minutes of immersion. To 50 parts of the above varnish is added 0.6% lead and 0.06% cobalt as naphthenates based upon the oil content of the varnish The varnish air dries to a tack-free film in 7½ hours. The dried film possesses a Sward hardness of 27 after 24 hours and 47 after 96 hours.

The following table is presented to show differences between varnishes prepared from "Alinco Z-2" bodied linseed oil and the varnishes prepared from Examples 2, 3 and 6:

directly to a water-cooled condenser. Heating is carried out at 200°-210° C. for 6 hours.

15.9 parts of distillate are collected in the water-trap. A light-colored, tough product is secured which possesses an acid number of 16.2. The modified alkyd resin is dissolved in xylol to form a clear solution of 50% solids. 0.015% cobalt as cobalt naphthenate based upon the soya bean oil acids content of the resin is added and a film baked for 1 hour at 120° C. The baked film is non-yellowing and hard. It turns white in 1% aqueous alkali after standing for ½ hour.

EXAMPLE 9

One hundred parts of an alkyd resin of acid number 30 (formed by heating a mixture of 148 parts phthalic anhydride, 80 parts glycerol, 140 parts linseed oil acids and 150 parts linseed oil) and 30 parts of the allyl ester of allylphenoxyacetic acid are heated together in a 500 ml., 3-neck flash equipped with a thermometer, stirrer, and water-cooled condenser to 200° C. in one hour. Heating is thereafter continued at 200° C.-220° C. for 6 hours. A relatively viscous syrup is secured.

This reaction product is dissolved in an equal amount of xylol to form a clear solution. A film of the solution when baked for an hour at 120° C. clouded only after one hour in 1% aqueous alkali.

EXAMPLE 10

A mixture of 111.2 parts of soya bean oil acids, 14.5 parts of pentaerythritol (technical grade) and 20 parts of the allyl ether of diallyl phenol is heated in a 500 ml., 3-neck flask equipped with a thermometer, stirrer, and water-cooled condenser attached directly to a water-trap. Heating is carried out to 200° C. in one hour and thereafter as follows:

200°-210° C. for 2 hours,
240°-250° C. for 2 hours, and
270°-280° C. for 3 hours During the reaction, there are 6.3 parts of water collected. A relatively viscous, light-colored oil is produced having an acid number of 10.1 and a Gardner viscosity of H.

Twenty-five parts of ester gum and 40 parts of the oil of the above example are heated together to 280° C. in 15 minutes and finally at 280° C.-290° C. for 58 minutes. The resulting varnish base could be drawn into a string 18 inches in length. It is cooled to 150° C. and thinned with 65 parts of xylol. 0.015% cobalt as cobalt naphthenate (based upon the drying oil) are added.

*Varnishes*

|  | "Alinco" Z-2 oil | Example Numbers | | |
|---|---|---|---|---|
|  |  | 2 | 3 | 6 |
| Cooking time at 280° C.–290° C. (min.) | 110 | 70 | 60 | 70. |
| Gardner viscosity (50% Solids) | D | E | F | F. |
| Drying time (tack free) | 7½ | 4¼ hrs | 5 hrs | 4. |
| Sward hardness (24 hrs.) | 27 | 33 | 29 | 57. |
| Sward hardness (96 hrs.) | 47 | 47 | 44 | 57. |
| Color of baked film | yellowed | non-yellowing | non-yellowing | non-yellowing. |
| Sward hardness of baked film | 24 | 41 | 39 | 55. |
| Resistance of baked film to 1% aqueous alkali | white in 15 min | white in 25 min | white in 35 min | white in 45 min. |

EXAMPLE 8

21 parts of phthalic anhydride, 29 parts of glycerol, 125.1 parts of soya bean oil acids and 30 parts of the allyl ether of diallyl phenol are placed in a 500 ml. 3-neck flask equipped with a thermometer, stirrer and a water-trap attached The varnish bakes to a hard clear film in ½ hour at 140° C. The baked film possesses a Sward Rocker hardness of 37 and turns cloudy in 1% aqueous alkali after 3¼ hrs. immersion.

It will be understood that it is intended to cover all changes and modifications of the examples of the invention herein chosen for the purpose of illustration which do not constitute departures from the spirit and scope of the invention.

We claim:

1. A composition comprising the reaction product at between 200° C. and 300° C. of (a) drying oil fatty acids material and (b) a monohydric phenolic compound containing from 2 to 4 beta-unsaturated aliphatic radicals having from 3 to 4 carbon atoms, said phenolic compound having the general formula:

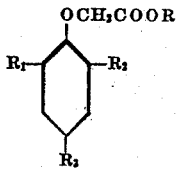

wherein R and $R_1$ represent said unsaturated radicals, and $R_2$ and $R_3$ are radicals selected from the group consisting of hydrogen, lower alkyl and the unsaturated radicals represented by R and $R_1$.

2. The composition of claim 1 wherein the phenolic compound is the allyl ester of allylphenoxyacetic acid.

3. A composition comprising the reaction product at between 200° C. and 300° C. of a drying oil with from 1% to 50% of a monohydric phenolic compound containing from 2 to 4 beta-unsaturated aliphatic radicals having from 3 to 4 carbon atoms, said phenolic compound having the general formula:

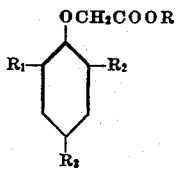

wherein R and $R_1$ represent said unsaturated radicals, $R_2$ and $R_3$ are radicals selected from the groups consisting of hydrogen, lower alkyl and the unsaturated radicals represented by R and $R_1$.

4. A composition comprising the reaction product at between 200° C. and 300° C. of linseed oil with from 1% to 50% of a monohydric phenolic compound containing from 2 to 4 beta-unsaturated aliphatic radicals having from 3 to 4 carbon atoms, said phenolic compound having the general formula:

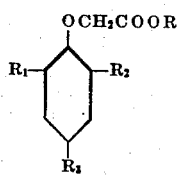

wherein R and $R_1$ represent said unsaturated radicals, $R_2$ and $R_3$ are radicals selected from the group consisting of hydrogen, lower alkyl and the unsaturated radicals represented by R and $R_1$.

5. A composition comprising the reaction product at between 200° C. and 300° C. of soya bean oil with from 1% to 50% of a monohydric phenolic compound containing from 2 to 4 beta-unsaturated aliphatic radicals having from 3 to 4 carbon atoms, said phenolic compound having the general formula:

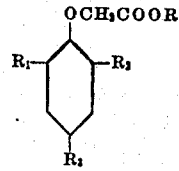

wherein R and $R_1$ represent said unsaturated radicals, $R_2$ and $R_3$ are radicals selected from the group consisting of hydrogen, lower alkyl and the unsaturated radicals represented by R and $R_1$.

6. A composition comprising the reaction product between 200° C. and 300° C. of a mixture of linseed oil, with from 1% to 50% of the allyl ester of allylphenoxy-acetic acid.

7. A solution of the product of claim 1 in a volatile hydrocarbon solvent therefor.

8. The process of making a composition adapted for use as a coating composition which comprises heating, at between 200° C. and 300° C., drying oil fatty acids material and a monohydric phenolic compound containing from 2 to 4 beta-unsaturated aliphatic radicals having from 3 to 4 carbon atoms, said phenolic compound having the general formula:

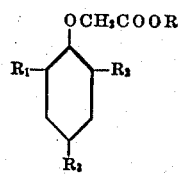

wherein R and $R_1$ represent said unsaturated radicals, and $R_2$ and $R_3$ are radicals selected from the group consisting of hydrogen, lower alkyl and the unsaturated radicals represented by R and $R_1$.

9. The process of claim 8 in which the phenolic compound is an allyl ester of allyl phenoxyacetic acid.

10. The process of claim 8 in which the phenolic compound is an allyl ester of diallyl phenoxyacetic acid.

11. The process of claim 8 in which the fatty acids material is linseed oil.

12. The process of claim 8 in which the fatty acids material is soya bean oil.

13. The process of claim 8 in which the fatty acids material is an alkyd resin.

14. The process of claim 8 in which the phenolic compound is an allyl ester of allyl phenoxyacetic acid, and the fatty acids material is linseed oil.

15. The process of claim 8 in which the phenolic compound is an allyl ester of diallyl phenoxyacetic acid, and the fatty acids material is linseed oil.

16. The process of claim 8 in which the phenolic compound is an allyl ester of allyl phenoxyacetic acid, and the fatty acids material is soya bean oil.

17. The process of claim 8 in which the phenolic compound is an allyl ester of diallyl phenoxyacetic acid, and the fatty acids material is soya bean oil.

18. The process of claim 8 in which the phenolic compound is an allyl ester of allyl phenoxyacetic acid, and the fatty acids material is an alkyd resin.

19. The composition of claim 1 in which the compound is an allyl ester of diallyl phenoxyactic acid.

20. The composition of claim 1 in which the fatty acids material is an alkyd resin.

21. The composition of claim 1 in which the compound is an allyl ester of diallyl phenoxyactic acid and the material is linseed oil.

22. The composition of claim 1 in which the compound is an allyl ester of diallyl phenoxyacetic acid and the material is soya bean oil.

23. The composition of claim 1 in which the compound is allyl ester of allyl phenoxyacetic acid and the material is an alkyd resin.

JOHN B. RUST.
WILLIAM B. CANFIELD.

REFERENCES CITED

The following references are of record in the file of this patent:

UNITED STATES PATENTS

| Number | Name | Date |
|---|---|---|
| 2,285,797 | Bellefontaine et al. | June 9, 1942 |